United States Patent [19]
Wakai et al.

[11] Patent Number: 5,244,621
[45] Date of Patent: Sep. 14, 1993

[54] PROCESS FOR SHAPING CERAMIC COMPOSITES

[75] Inventors: Fumihiro Wakai; Yasuharu Kodama, both of Nagoya; Kansei Izaki; Takamasa Kawakami, both of Tsukuba, all of Japan

[73] Assignees: Mitsubishi Gas Chemical Company, Inc.; Director-General of the Agency of Industrial Science and Technology, both of Tokyo, Japan

[21] Appl. No.: 865,683

[22] Filed: Apr. 8, 1992

Related U.S. Application Data

[63] Continuation of Ser. No. 615,874, Nov. 20, 1990, abandoned.

[30] Foreign Application Priority Data

Dec. 26, 1989 [JP] Japan ................................. 1-335063
Aug. 23, 1990 [JP] Japan ................................. 2-220048

[51] Int. Cl.[5] ....................... C04B 35/56; C04B 35/58
[52] U.S. Cl. ...................................... 264/291; 264/65; 264/66; 264/325; 264/332; 264/60
[58] Field of Search .................. 264/65, 332, 60, 291, 264/325, 66

[56] References Cited

U.S. PATENT DOCUMENTS

| | | | |
|---|---|---|---|
| 3,895,219 | 7/1975 | Richerson et al. | 219/553 |
| 4,184,882 | 1/1980 | Lange | 501/92 |
| 4,572,902 | 2/1986 | Matano et al. | 501/97 |
| 4,594,330 | 6/1986 | Suzuki et al. | 501/92 |
| 4,732,719 | 3/1988 | Panda et al. | 264/65 |
| 4,752,427 | 6/1988 | Wakai et al. | 264/332 |
| 4,784,818 | 11/1988 | Wakai et al. | 264/291 |
| 4,800,182 | 1/1989 | Izaki et al. | 501/92 |

FOREIGN PATENT DOCUMENTS 54-76069B 9/1979 Japan .
54-80022B 9/1979 Japan .
62-278169 10/1987 Japan .

OTHER PUBLICATIONS

Wakai et al, A Superplastic Covalent Crystal Composite In Nature, vol. 344, 29 Mar. 1990, pp. 421-423.
Wakai et al, "Superplasticity, of Ceramics, Ceramics International" vol. 17, 153-163 (1991).
Tottle C. R., An Encyclodpardia of Metallurgy and Materials, the Metals Society, 1984, MacDonald & Evans, p. 110.
Karunaratne, Grain-Boundary de-Segregation and Intergranular Cohesion in Si-Al-D-N Ceramics, Journal of Mat. and Sci (1980) No. 7810 & 784

*Primary Examiner*—James Derrington
*Attorney, Agent, or Firm*—Leydig, Voit & Mayer

[57] ABSTRACT

There are disclosed in process for shaping ceramic composites which comprises shaping a sintered silicon nitride-silicon carbide composite material having a microstructure formed predominantly of equiaxed grains with an average grain size of 2 $\mu$m or below and a silicon carbide content of 10-50% by volume, obtained by liquid-phase sintering, at least 40% by volume of the silicon nitride in the material being in the $\beta$-phase, by superplastically deforming said material at a strain rate of $10^{-6}sec^{-1}$ to $10^{-1}sec^{-1}$ under application of tensile stress or compressive stress in a superplastic temperature region of 1400°-1700° C., and a process for shaping ceramic composites which comprises shaping said sintered composite material by superplastic deformation as described above and then heat-treating the shaped article obtained in a non-oxidizing atmosphere under normal or applied pressure at 1000°-2300° C.

14 Claims, 1 Drawing Sheet

PROCESS FOR SHAPING CERAMIC COMPOSITES

This application is a continuation of application Ser. No. 07/615,874 filed Nov. 20, 1990, now abandoned.

BACKGROUND OF THE INVENTION

The present invention relates to a process for shaping ceramic composites. In more particular, it relates to a process for shaping ceramic composites by superplastically deforming a sintered silicon nitride-silicon carbide composite material having a special microstructure formed predominantly of equiaxed grains under application of tensile stress or compressive stress, and to a process for shaping ceramic composites which can provide shaped articles with excellent in strength and fracture toughness by shaping said ceramic composites by superplastic deformation as described above and then heat-treating the shaped body.

RELATED ART OF THE INVENTION

Silicon nitride and silicon carbide have recently attracted much attention as ceramics for use in structural materials of so-called non-oxide type and have come to be used in a variety of fields.

Although silicon nitride and silicon carbide have thus come to be used by virtue of their excellent heat resistance, heat shock resistance, abrasion resistance, and corrosion resistance, they belong to so-called brittle materials and hence are very poor in machinability. Accordingly, members formed of silicon nitride or silicon carbide are usually produced by shaping powders of the starting material by such means as casting, die molding, and injection molding, sintering the shaped bodies, and then processing them. Further, although fairly intricate shapes can be given in the shaping processes of prior art, shrinkage takes place in sintering, so that in those members which require a high precision, the final products have had to be obtained by subjecting the shaped articles to primary sintering, cutting work, secondary sintering and then further to grinding and polishing.

Thus, the hardness or brittleness of ceramics, which are in themselves their inherent virtues, lead to, a disadvantage in shaping and processing in the production of ceramic articles. Further, such poor efficiency in processing causes the increase of production cost, being thus a serious obstacle to the production of ceramic articles in a larger scale.

In metallic materials which show a high ductility, on the other hand, shaped articles are being produced efficiently and at a low cost by means of so-called plastic deformation. Such excellent machinability is one of the main factors contributing to extending the use of metallic materials widely. If such plastic deformation can be applied to such non-oxide type ceramics as silicon nitride and silicon carbide, the production cost will be greatly reduced as compared with that in the prior processes, and a larger scale production of ceramics for use in structural materials and a drastic expansion of their uses can be expected.

However, prior silicon nitride and silicon carbide show brittle fracture at room temperature and, at a high temperature region of 1200° C. or above, the deformation at a uniaxial tensile creep test is 0.8% for hot-pressed silicon nitride and 3% or less for pressureless-sintered silicon nitride, for example, so that they are ruptured without undergoing stable deformation. Therefore, it has been impossible to apply plastic deformation to silicon nitride or silion carbide.

Some kinds of metallic alloys are difficult to process by plastic deformation. For such metallic materials, it is practiced to mold or shape the materials by forming fine crystal grains therein under a controlled strain rate and in a controlled temperature region and thus making them undergo so-called superplastic deformation. In said superplastic deformation the material undergoes deformation under a stress far lower than that at usual yield point without inducing the phenomenon of necking, a deformation of as large as several hundred per cent being possible in some kinds of materials. It is known that such a process makes it possible to produce articles of intricate shapes relatively inexpensively even from metallic alloys difficultly processable by plastic deformation (U.S. Pat. No. 4,784,818).

Said phenomenon of superplastic deformation has not yet been found to occur in such non-oxide type of ceramics as silicon nitride and silicon carbide.

The present inventors have made extensive study on the superplastic deformation of such non-oxide type of ceramics as silicon nitride and silicon carbide. As a result, it has been found that a sintered silicon nitride-silicon carbide composite material having a microstructure formed predominantly of fine equiaxed grains, when subjected to uniaxial tensile stress or compressive stress of a controlled strain rate at a controlled temperature, shows a high ductility without inducing the phenomenon of necking, namely shows superplasticity, and can shaped thereby.

Further, upon investigation of the shaping process utilizing the superplastic deformation (hereinafter sometimes referred to as superplastic shaping), it was found that the shaped articles obtained by superplastic shaping was not fully satisfactory in strength, facture toughness or heat resistance for use as structural materials, etc. as such, because fine cavities tended to develop in the shaped body during the step of superplastic shaping.

Accordingly, the present inventors have made extensive study on said shaping process and resultantly found that by applying a heat treatment to the shaped body obtained by superplastic shaping, the strength, fracture toughness or heat resistance of the resulting shaped article are markedly improved as compared with those of the shaped body immediately after the superplastic shaping.

The first object of the present invention is to provide a process for shaping non-oxide type of ceramics by superplastic shaping.

The second object of the present invention is to provide a process which can give shaped articles more excellent in strength, fracture toughness or heat resistance than those obtained by superplastic shaping alone at a low cost by subjecting non-oxide type of ceramics to superplastic shaping and then to a heat treatment.

The third object of the present invention is to provide a process which can give a shaped body of a desired shape without the need of going through complicated molding or shaping steps as in the prior art methods, by shaping a sintered silicon nitride-silicon carbide composite material having a special microstructure prepared by liquid phase sintering, by means of superplastic shaping.

SUMMARY OF THE INVENTION

The present invention relates to a process for shaping ceramic composites which comprises shaping a sintered silicon nitride-silicon carbide composite material having a microstructure formed predominantly of equiaxed grains with an average grain size of 2 $\mu$m or below and a silicon carbide content of 10–50% by volume obtained by liquid phase sintering, at least 40% by volume of the silicon nitride being in the $\beta$-phase, by superplastically deforming said material at a strain rate of $10^{-6}\text{sec}^{-1}$ to $10^{-1}\text{sec}^{-1}$ under application of tensile stress or compressive stress in a superplastic temperature region of 1400°–1700° C., and also to a process for shaping ceramic composites which comprises shaping said sintered composite material by superplastically deforming the material as described above and then heat-treating the shaped body in a non-oxidative gas atmosphere at 1000°–2300° C. under normal or applied pressure.

By superplastically shaping the sintered silicon nitride-silicon carbide composite material having the microstructure as specified in the present invention, a precision forming into a desired shape can be achieved without going through complicated molding and shaping steps conventionally taken in the molding and shaping of sintered silicon nitride materials and sintered silicon nitride-silicon carbide composite materials and, by further applying a heat treatment after the shaping, the strength, fracture toughness or heat resistance can be improved. Thus, high temperature, high-strength materials of gas turbines and engines, heat-insulating materials, abrasion resistant materials, cutting tools, etc. which require high dimensional accuracy and excellent mechanical properties can be produced efficiently and inexpensively.

Moreover, according to the process of the present invention, intricate shapes can be obtained from a sintered silicon nitride-silicon carbide composite material of simple shapes.

DETAILED DESCRIPTION OF THE INVENTION

Figure 1:
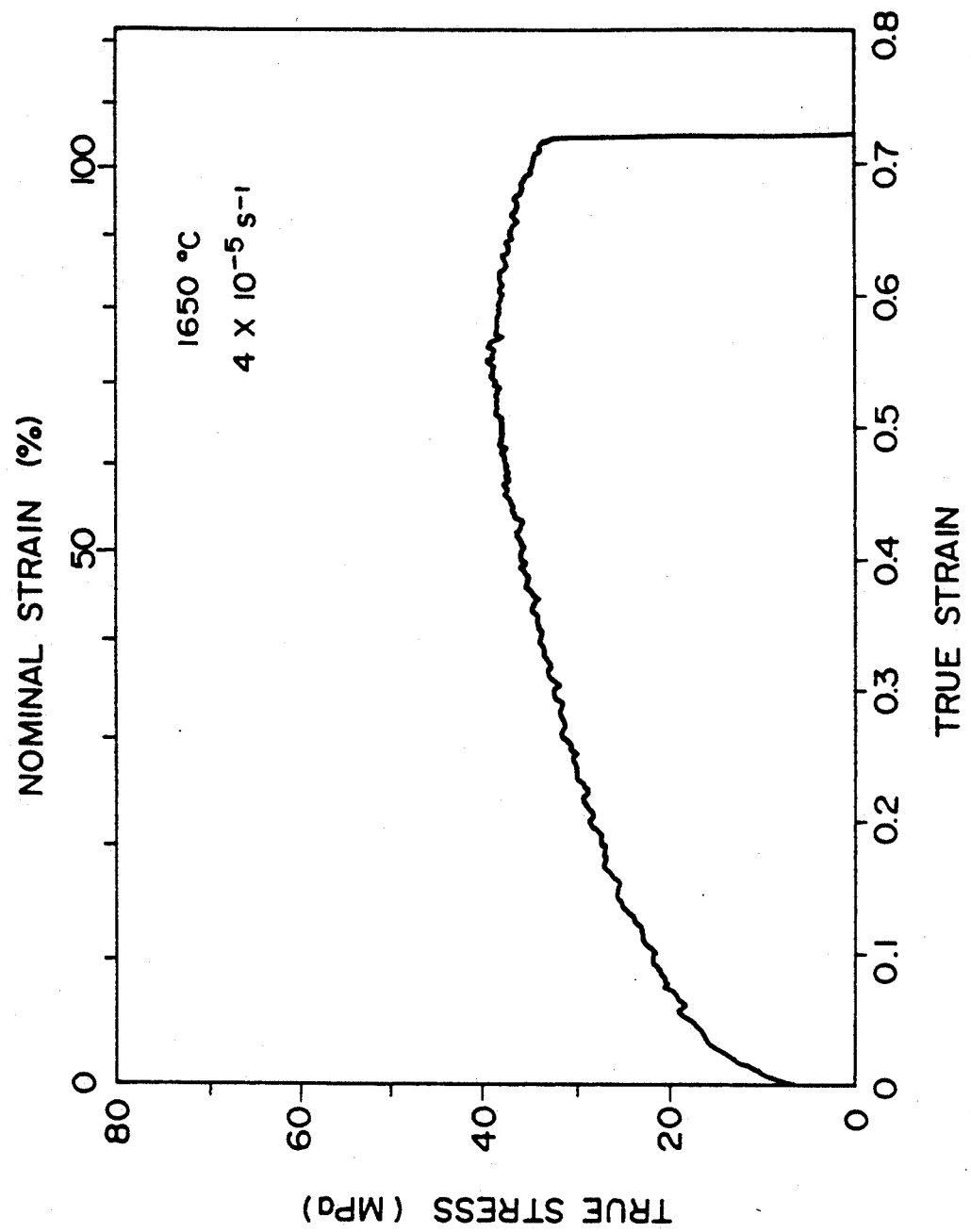
FIG. 1 shows a stress/strain curve of a sintered silicon nitride-silicon carbide composite material in Example 2, at a strain rote of $4 \times 10^{-5}\text{sec}^{-1}$ at 1650° C.

The ceramic composites, namely sintered silicon nitride-silicon carbide composite materials, used in the present invention, have a microstructure formed predominantly of equiaxed grains with an average grain size of 2 $\mu$m or blow and a silicon carbide content of 10–50% by volume, are obtained by liquid phase sintering, and at least 40% by volume of the silicon nitride in the sintered material is in the $\beta$-phase.

When the sintered composite material has an average grain size exceeding 2 $\mu$m or when the material is not formed of equiaxed grains but, for example, of a structure formed of elongated grains tangled with one another, the shaping process of the present invention, namely superplastic shaping, can be difficultly applied to the material. This is because cavities develop when a stress is applied in a temperature region where deformation occurs, resulting in marked deterioration in the strength and other mechanical properties of the shaped article obtained.

For example, since conventionally used silicon nitride is of a large grain size and has a structure formed of elongated grains tangled with one another, it deforms only in a small amount even in a high temperature region and ruptures without undergoing stable deformation or develops cavities, resulting in serious deterioration in mechanical properties.

The content of silicon carbide is suitably 10–50% by volume. When the content is below said range, grain growth occurs in the course of deformation and hinders the deformation, whereas when the content is above said range, a dense sintered body can be difficultly obtained. Further, at least 40% by volume of silicon nitride should be in the $\beta$-phase. When the proportion of the $\beta$-phase is low, $\alpha$-$\beta$ transition occurs during the process of shaping of the present invention, promoting the growth of grains and conversion thereof into elongated grains, so that a stable deformation cannot take place.

The sintered silicon nitride-silicon carbide composite material suited for the shaping process of the presented invention may be obtained by mixing amorphous powder composed of silicon, carbon, nitrogen and oxygen and having a carbon content of 3.0–15.0% by weight and an average grain diameter of 1 $\mu$m or below with a sintering aid which forms a liquid phase in the course of sintering, and sintering the mixture at a sintering temperature of 1500°–2000° C. (U.S. Ser. No. 527,845 and U.S. Pat. No. 4,800,182).

Amorphous powders having the above-mentioned composition which can be favorably used are amorphous powders essentially consisting of silicon, carbon, nitrogen and oxygen obtainable, for example, by the processes disclosed in Japanese Patent Application "Kokai" (Laid-open) Nos. 60-200,812, 60-200,813, 60-221,311, 60-235,707 and 61-117,108 and U.S. Pat. No. 4,594,330. These powders are so designed, already in the stage of starting materials, that silicon carbide and silicon nitride may mixed well with each other, and are favorably used to obtain sintered materials of a uniform microstructure containing uniformly dispersed silicon carbide, suited to the process of the present invention. The silicon carbide present in the starting powder has functions of acting as nuclei for crystallization of silicon nitride in the sintering process and of suppressing the grain growth of silicon nitride, so that the microstructure of the sintered silicon nitride-silicon carbide composite material formed varies depending on the amount of silicon carbide in the starting material.

Thus, when the amount of silicon carbide is small the silicon nitride assumes a structure rich in elongated grains, whereas when the amount of silicon carbide is large, the silicon nitride tends to assume a structure rich in equiaxed grains because the grain growth is suppressed.

Accordingly, the amount of carbon in the starting powder should be 0–15.0% by weight to obtain a sintered material suited for the shaping process of the present invention. When the amount of carbon is smaller than said value, conversion into elongated grains of silicon nitride and its grain growth occur, and the powder cannot be used for the shaping process of the present invention. When the amount of carbon is larger than the value a dense sintered material can be hardly obtained.

A starting powder having a suitable carbon content for use in the present invention is mixed with a sintering aid which forms a liquid phase in the course of sintering and, when molding is performed, also with a binder for molding.

The sintering aid used in obtaining a sintered material employed in the present invention may be any of those conventioally used for silicon nitride and silicon carbide. Specific examples thereof include MgO, $Al_2O_3$, $Y_2O_3$, AlN, $SiO_2$, lanthanum-base oxides or the like. They may be used each alone or as a mixture thereof.

The amount of these sintering aids used is usually in the range of 0.1–20% by weight. Said mixing may be conducted by any of the dry mixing and wet mixing methods conventionally used.

Then, the mixed powder is given an intended shape beforehand by such means as die molding, casting, injection molding, etc. except for the case of direct sintering from powder as in hot-pressing and HIP.

In the sintering, those methods which have been conventionally used may be employed as they are, including usual pressureless sintering, hot-pressing, gas pressure sintering, and HIP. The sintering temperature is suitably 1500°–2000° C. though it somewhat varies depending on the sintering method. Usually those temperatures and times are selected which suppress the grain growth of the composition and do not cause the conversion of silicon nitride into elongated grains. The sintering conditions are influenced also by the composition of the starting powder. For example, when a starting powder containing 10% by weight of carbon is sintered by a typical hot-pressing method, the sintering is conducted under conditions of 1600°–1750° C., 200–400 kg/cm² hours. When the starting powder contains 6% by weight of carbon, suitable conditions are 1500°–1700° C., 200–400 kg/cm² and 0.5–5.0 hours. It is needless to say that these conditions may be influenced also by the kinds of sintering aid used.

In the sintered silicon nitride-silicon carbide composite material thus obtained, silicon carbide is predominantly in the $\beta$-phase and at least 40% of silicon nitride is in the $\beta$-phase. The grains constituting the material have an average grain diameter of 2 $\mu$m or below and are predominantly equiaxed. The relative density of the material should be at least 90%.

In the case of HIP or gas pressure sintering, on the other hand, since the decomposition temperature of silicon nitride can be elevated the sintering temperature can be increased. Such sintering methods can make it possible to convert the silicon carbide in the sintered silicon nitride-silicon carbide composite material into a state rich in the $\alpha$-phase.

According to the present invention, the sintered silicon nitride-silicon carbide composite material formed of fine, predominantly equiaxed grains thus obtained is formed into an intended shape by subjecting the material to tensile stress or compressive stress in a superplastic temperature region.

Said superplastic temperature region is usually 1400°–1700° C., preferably 1450°–1650° C. In a temperature region higher than said range, thermal deterioration of the sintered silicon nitride-silicon carbide composite material occurs, making the material undergo a stable deformation with difficulty and resulting in deterioration of the property of shaped articles. In a temperature region lower than said range the shaping velocity is low, which is disadvantageous economically.

In the present invention, the strain rate under applied tensile stress or compressive stress may be optimized in accordance with the shaping temperature. When shaping is performed at an excessively high strain rate, cavities caused by intergranular slip will develop in the shaped article, which may interlink one another to form a large defect, lowering the strength of the shaped article, or make the material porous, exerting an adverse effect on the mechanical property. On the other hand, when shaping is conducted at an excessively low strain rate, the sintered material is exposed to a high temperature for a long time and is hence liable to undergo thermal deterioration. Therefore, the strain rate in shaping is desirably $10^{-6} sec^{-1}$ to $10^{-1} sec^{-1}$, preferably not more than $10^{-3} sec^{-1}$.

The atmosphere in shaping may be either an oxidizing atmosphere or a non-oxidizing atmosphere, but is preferably a non-oxidizing one. This is for preventing the sintered silicon nitride-silicon carbide composite material from being deteriorated by oxidation during the superplastic shaping. When the shaping is completed in a short time it may be conducted also in an oxidizing atmosphere, but when it takes a long time it is preferably conducted in a non-oxidizing atmosphere.

The devices used in the shaping are made of ceramics, graphite or super high temperature alloys, and are selected according to the atmosphere and temperature in shaping.

By conducting shaping in such superplastic temperature regions it is possible, for example, to form a thin plate by compression, to bend a thin plate, or to perform precision shaping in a precise die which has been worked into an intended shape. Further, it is possible to shape a specific part along which requires a particularly high precision by the shaping process of the invention, to improve production efficiency and reduce cost. Thus, according to the invention, shaped articles of intricate shapes can be derived from sintered materials of simple shapes.

The shaped body obtained by the superplastic shaping according to the present invention has a structure formed predominantly of equiaxed grains like that before the shaping, so that it shows a low fracture toughness as compared with prior silicon nitride comprising highly developed elongated grains. Further, small cavities are liable to develop inside and on the surface of the sintered material as the result of superplastic shaping, which tends to lower the strength after the shaping as compared with that before the shaping. Accordingly, shaped bodies obtained by superplastic shaping are not always satisfactory in strength and fracture toughness for use as structural materials etc.

According to the present invention, therefore, a heat treatment is applied after superplastic shaping. The heat treatment causes the change of structure of sintered material to improve the fracture toughness and strength, or eliminates or reduce the cavities formed to give a high strength to the material. Further, the heat treatment causes the modification of the composition of grain boundary phase into a highly heat resistant one or conversion of the glass phase into the crystalline phase, thereby improving the heat resistance.

The heat treatment in the present invention for achieving such objects is performed in a non-oxidizing atmosphere under normal or applied pressure generally at 1000°–2300° C., preferably at 1200°–1900° C.

When the heat treatment is conducted at normal pressure, the temperature is preferably not higher than 1800° C. When it is conducted under applied pressure, e.g. gas pressure or HIP, the temperature is preferably in a range wherein no decomposition of silicon nitride takes place, namely not higher than 2300° C. The heat treatment time varies depending on the composition and the shape of the shaped body and on the heat treatment temperature, but is usually about 1-24 hours. The heat the structure of the shaped body from that formed of fine equiaxed grains into a structure comprising grown elongated grains and equiaxed grains, and said change in microstructure cause marked improvement in fracture toughness and strength as compared with those before heat treatment. Further, the elimination or reduction of the cavities formed in the shaped body results in improvement of the strength of the shaped body. Particularly when the heat treatment is performed under applied pressure, e.g. gas pressure, HIP, etc., more excellent results can be obtained because the decomposition of silicon nitride is suppressed or the elimination or reduction of the cavities in the shaped body is achieved more readily. Further, since the grain boundary phase is converted into a more highly heat resistant composition or is crystallized by the heat treatment, the fracture toughness and heat resistance are improved.

The heat treatment may be performed subsequently to the superplastic shaping without once cooling, or it may be performed by cooling the superplastically shaped body down to room temperature and then heating it up to a predetermined temperature.

Thus, in the present invention, firstly shaping is effected in the superplastic temperature region, whereby, for example, thin plates can be formed by compression, thin plates can be bended, or precision shaping can be achieved in a precise die which has been worked into a desired shape. Further, by performing heat treatment according to the present invention, the strength, fracture toughness or heat resistance of the shaped article can be markedly improved as compared with those of the shaped article immediately after the superplastic shaping. The shaped articles heat-treated according to the present invention may be further treated in an oxidizing atmosphere. Such a heat treatment in an oxidizing atmosphere can improve the surface condition of the shaped article.

The present invention will be described in detail below with reference to Examples, which are presented merely for the sake of illustration and not to be construed as limiting the invention.

EXAMPLES 1 and 2

An amorphous powder consisting essentially of silicon, carbon, nitrogen and oxygen containing 9.6% by weight of carbon and having an average particle diameter of 1 $\mu$m or below was mixed with 6% by weight of $Y_2O_3$ and 2% by weight of $Al_2O_3$, and wet-mixed in ethanol and dried. The dried mixture was filled in a graphite die of 50 mm in diameter and sintered by hot-pressing in nitrogen gas at a pressure of 350 kg/cm$^2$ at 1700° C. for 1 hour. The resulting sintered material was a sintered silicon nitride-silicon carbide composite material having a density of 3.28 g/cm$^3$ and a proportion of silicon nitride in the $\beta$-phase of 96% and formed of predominantly equiaxed grains of an average grain size of 1 $\mu$m or below.

Test pieces having a cylindrical part of 3 mm in diameter and 10 mm in length were prepared from the sintered material. The test pieces were subjected to tensile deformation at a strain rate of $8\times10^{-5}\text{sec}^{-1}$ and $4\times10^{-5}\text{sec}^{-1}$, respectively, in a high temperature furnace set at 1650° C. in nitrogen atmosphere. The deformation stress was 20-50 MPa, and the nominal strain after deformation was 110% in both cases. The result at a strain rate of $4\times10^{-5}\text{sec}^{-1}$ at 1650° C. is shown in FIG. 1. A uniform elongation was observed, no necking due to deformation being recognized.

EXAMPLE 3

A test piece of 5 mm in length, 5 mm in width and 3 mm in thickness was prepared from the same sintered silicon nitride-silicon carbide composite material as that used in Example 1. The test piece was placed in a high temperature furnace with a graphite plate interposed therebetween and subjected to compression deformation at a strain rate of $8\times10^{-5}\text{sec}^{-1}$ in an argon gas stream at 1650° C. to obtain a sheet of 2 mm in thickness. Neither cracking nor deterioration was recognized in the sheet though the thickness was reduced by 1 mm.

EXAMPLES 4 to 6

An amorphous powder consisting essentially of silicon, carbon, nitrogen and oxygen containing 6.2% by weight of carbon and having a particle size of 1 $\mu$m or below was mixed with 6% by weight of $Y_2O_3$ and 2% by weight of $Al_2O_3$, and wet-mixed in ethanol and then dried. The dried mixture was filled in a graphite die of 50 mm in diameter and sintered by hot-pressing in nitrogen gas at a pressure of 350 kg/cm$^2$ at 1650° C. for 1 hour.

The resulting sintered material was a sintered silicon nitride-silicon carbide composite material having a density of 3.29 g/cm$^3$ and a proportion of silicon nitride in the $\beta$-phase of 73% and formed of predominantly equiaxed grains of an average grain size of 1 $\mu$m or below.

Test pieces similar to that in Example 1 were prepared from the sintered material and subjected to a tension test at a strain rate of $8\times10^{-5}\text{sec}^{-1}$, $4\times10^{-5}\text{sec}^{-1}$ and $2\times10^{-5}\text{sec}^{-1}$, respectively, in a high temperature furnace at 1600° C. Resultantly, the nominal strains after deformation were 56%, 105% and 210%, respectively.

EXAMPLES 7 to 9

The same starting powder as that used in Examples 4 to 6 was sintered by hot-pressing to obtain sintered silicon nitride-silicon carbide composite materials formed of predominantly equiaxed grains having an average size of 2 $\mu$m or below, as shown in Table 1.

Test pieces similar to that in Example 1 were prepared from the sintered materials and subjected to a tension test at a strain rate of $8\times10^{-5}\text{sec}^{-1}$ in a high temperature furnace under various temperature conditions to obtain the results shown in Table 1.

TABLE 1

| Example No. | 7 | 8 | 9 |
|---|---|---|---|
| Density (g/cm$^3$) | 3.30 | 3.30 | 3.20 |
| Si$_3$N$_4$, $\beta$-phase ratio (%) | 97 | 97 | 67 |
| Tension test | | | |
| Temp. (°C.) | 1650 | 1600 | 1600 |
| Result of deformation | | | |
| Strain (%) | 45 | 65 | 52 |
| Deformation stress (MPa) | 10-25 | 20-35 | 40-55 |

COMPARATIVE EXAMPLE 1

A conventional sintered silicon nitride material comprising elongated grains tangled with one another was subjected to a tension test at a strain rate of $8\times10^{-5}\text{sec}^{-1}$ and a deformation temperature of 1600° C. in the same manner as in Example 4, to find that the material ruptured at a strain of 5%.

EXAMPLE 11

An amorphous powder consisting essentially of silicon, carbon, nitrogen and oxygen containing 7.2% of carbon and having an average particle diameters of 1 μm or below was mixed with 6% by weight of $Y_2O_3$ and 2% by weight of $Al_2O_3$, and wet-mixed in ethanol and then dried. The dried mixture was filled in a graphite die of 50 mm in diameter and sintered by hot-pressing in nitrogen gas at a pressure of 350 kg/cm² at 1650° C. for 1 hour. The resulting sintered material was a sintered silicon nitride silicon carbide composite material having a density of 3.2 g/cm³ formed predominantly of equiaxed grains.

A test piece having a cylindrical part of 3 mm in diameter and 10 mm in length was prepared from the sintered material. The test piece was stretched until the length of the cylindrical part reached 14.4 mm and shaped into a diameter of 2.5 mm by application of a tensile stress at a strain rate of $4 \times 10^{-5} \text{sec}^{-1}$ in a high temperature furnace set at 1600° C. in a nitrogen atmosphere. The fracture toughness and the room temperature flexural strength after the superplastic shaping were 5.4 MPa·m$^{\frac{1}{2}}$ and 520 MPa, respectively.

Then the superplastically shaped test piece was held in a nitrogen atmosphere at normal pressure and at 1750° C. for 2 and the fracture toughness and flexural strength were determined to find that the fracture toughness had been improved to 6.4 MPa·m$^{\frac{1}{2}}$ and the flexural strength at room temperature to 850 MPa.

EXAMPLES 12 to 15

Test pieces (each 35 mm square and 5 mm thick) prepared from the same sintered material as used in Example 1 were each placed in a high temperature furnace with a graphite plate interposed therebetween in nitrogen atmosphere at 1600° C., and subjected to compression deformation (i.e., superplastic shaping) at a strain rate of $8 \times 10^{-5} \text{sec}^{-1}$, to obtain a thin plate of 4 mm in thickness. The thin plate showed neither cracking nor deterioration and gave a fracture toughness and flexural strength after superplastic shaping of 5.3 MPa·m$^{\frac{1}{2}}$ and 620 MPa, respectively.

Then the superplastically shaped articles were heat-treated under the conditions shown in Table 2. In all cases, fracture toughness and strength were significantly increased in comparison to those before the heat treatment were obtained.

TABLE 2

| | Example No. | 12 | 13 | 14 | 15 |
|---|---|---|---|---|---|
| Heat treatment | Temperature (°C.) | 1300 | 1700 | 1750 | 1850 |
| | Time (hrs) | 24 | 4 | 2 | 1 |
| | Atmosphere | $N_2$ | $N_2$ | $N_2$ | Ar |
| | Pressure (atm) | 1 | 1 | 9.5 | 100 |
| Property | Fracture toughness (MPa · m$^{\frac{1}{2}}$) | 5.9 | 6.2 | 6.5 | 6.7 |
| | Flexural strength at room temp. (MPa) | 680 | 750 | 815 | 970 |

EXAMPLE 16

An amorphous powder of 1 μm or below in size consisting essentially of silicon, carbon, nitrogen and oxygen and containing 9.6% by weight of carbon was mixed with 6% by weight of $Y_2O_3$ and 2% by weight of $Al_2O_3$, and wet-mixed in ethanol and then dried. The dried mixture was filled in a graphite die of 50 mm in diameter and sintered by hot-pressing in nitrogen gas at a pressure of 350 kg/cm² at 1650° C. for 1 hour. The resulting sintered material was a sintered silicon nitride-silicon carbide composite material having a density of 3.26 g/cm³ formed predominantly of equiaxed grains.

The sintered material was superplastically deformed under the same conditions as in Example 12 to obtain a test piece (namely, superplastically shaped article) of 4 mm in thickness.

The test piece has a fracture toughness of 5.2 MPa·m$^{\frac{1}{2}}$ and a flexural strength at room temperature of 740 MPa. It showed a flexural strength of 370 MPa at 1300° C., revealing that is had undergone plastic deformation. Then, the shaped article after the superplastic shaping was held in nitrogen atmosphere at 1750° C. for 4 hours and its fracture toughness, room temperature strength and high temperature strength were determined. The fracture toughness was 6.2 MPa·m$^{\frac{1}{2}}$ and the flexural strength at room temperature was 890 MPa. The flexural strength at 1300° C. was 700 MPa, thus no plastic deformation being recognized in this case. The fact that no plastic deformation is recognized even in heating at 1300° C. signifies that the heat resistance of the shaped article has been improved.

What is claimed is:

1. A process for shaping ceramic composites which comprises shaping a sintered silicon nitride-silicon carbide composite material:
   (i) having a microstructure formed predominantly of equiaxed grains with an average grain size of 2 μm or below, and a silicon carbide content of 10–50% by volume obtained by liquid phase sintering, and at least 40% by volume of silicon nitride being in the μ-phase;
   (ii) showing an elongation of 45% to 210%, as determined by a tension test, by superplastically deforming said material at a strain rate of $10^{-6} \text{sec}^{-1}$ to $10^{-1} \text{sec}^{-1}$ under application mainly of tensile stress in a superplastic temperature of 1400°–1700° C.

2. A process according to claim 1 wherein the sintered silicon nitride-silicon carbide composite material is obtained by mixing amorphous powder composed of silicon, carbon, nitrogen and oxygen and having a carbon content of 3.0–15.0% by weight and an average grain diameter of 1 μm or below with a sintering aid which forms a liquid phase in the course of sintering, and sintering the mixture at a sintering temperature of 1500°–2000° C.

3. A process according to claim 2 wherein the sintering aid which forms a liquid phase in the course of sintering is at least one member selected from the group consisting of MgO, $Y_2O_3$, $Al_2O_3$, AlN, $SiO_2$ and lanthanum base oxides.

4. A process according to claim 1 wherein the superplastic temperature region is 1450 to 1650° C.

5. A process according to claim 1 wherein the superplastic deformation is performed at a strain rate of $10^{-6} \text{sec}^{-1}$ to $10^{-3} \text{sec}^{-1}$ under application mainly of tensile stress.

6. A process according to claim 1 wherein the superplastic deformation is performed in a non-oxidizing atmosphere.

7. A process for shaping ceramic composites which comprises shaping a sintered silicon nitride-silicon carbide composite material;
   (i) having a microstructure formed predominantly of equiaxed grains with an average grain size of 2 μm or below, and a silicon carbide content of 10–50% by volume obtained by liquid phase sintering, and at least 40% by volume of silicon nitride being in the β-phase, (ii) showing an elongation of 45% to 210%, as determined by a tension test, by superplastically deforming said material at a strain rate of $10^{-6} \sec^{-1}$ to $10^{-1} \sec^{-1}$ under application mainly of tensile stress in a superplastic temperature region of 1400°-1700° C., and then heat-treating the shaped article in a non-oxidizing atmosphere under normal or applied pressure at 1000°-2300° C.

8. A process according to claim 7, wherein the sintered silicon nitride-silicon carbide composite material is obtained by mixing amorphous powder composed of silicon, carbon, nitrogen and oxygen and having a carbon content of 3.0-15% by weight and an average grain diameter of 1 μm or below with a sintering aid which forms a liquid phase in the course of sintering, and sintering the mixture at a sintering temperature of 1500°-2000° C.

9. A process according to claim 8 wherein the sintering aid which forms a liquid phase in the course of sintering is at least one member selected from the group consisting of MgO, $Al_2O_3$, $Y_2O_3$, AlN, $SiO_2$ and lanthanum base oxides.

10. A process according to claim 7 wherein the superplastic temperature region is 1450°-1650° C.

11. A process according to claim 7 wherein the superplastic deformation is performed at a strain rate of $10^{-6} \sec^{-1}$ to $10^{-3} \sec^{-1}$ under application mainly of tensile stress.

12. A process according to claim 7 wherein the superplastic deformation is performed in a non-oxidizing atmosphere.

13. A process according to claim 7 wherein the heat-treatment is performed in the range of 1200°-1900° C.

14. A process according to claim 7 wherein the heat-treatment is performed for 1-24 hours.

* * * * *

UNITED STATES PATENT AND TRADEMARK OFFICE
CERTIFICATE OF CORRECTION

PATENT NO. : 5,244,621

DATED : September 14, 1993

INVENTOR(S) : Wakai et al.

It is certified that error appears in the above-indentified patent and that said Letters Patent is hereby corrected as shown below:

Claim 1, column 10, line 38, after "temperature" insert --region--.

ON THE TITLE PAGE:
Item No. [56], References Cited, Other Publications, line 5, change "Encyclodpardia" to --Encyclopaedia--.

Signed and Sealed this

Twenty-sixth Day of April, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,244,621
DATED        : September 14, 1993
INVENTOR(S)  : Wakai et al.

It is certified that error appears in the above-indentified patent and that said Letters Patent is hereby corrected as shown below:

Col. 10, line 32, change "$\mu$-phase" to --$\beta$-phase--.

Signed and Sealed this

Twenty-ninth Day of November, 1994

Attest:

BRUCE LEHMAN

*Attesting Officer*    *Commissioner of Patents and Trademarks*